H. J. LEY.
BARN.
APPLICATION FILED FEB. 4, 1916.

1,226,783.

Patented May 22, 1917.
4 SHEETS—SHEET 1.

WITNESS
H.W. Meade

INVENTOR
Herbert Joseph Ley
BY
A. M. Wooster
ATTORNEY

H. J. LEY.
BARN.
APPLICATION FILED FEB. 4, 1916.

1,226,783.

Patented May 22, 1917.
4 SHEETS—SHEET 2.

WITNESS
Chester F. Hayden

INVENTOR
Herbert Joseph Ley
BY
A. M. Wooster
ATTORNEY

H. J. LEY.
BARN.
APPLICATION FILED FEB. 4, 1916.

1,226,783.

Patented May 22, 1917.
4 SHEETS—SHEET 4.

WITNESS
Chester T. Hayden.

INVENTOR
Herbert Joseph Ley
BY
A. M. Wooster
ATTORNEY

UNITED STATES PATENT OFFICE.

HERBERT JOSEPH LEY, OF LAWRENCEBURG, TENNESSEE.

BARN.

1,226,783.  Specification of Letters Patent.  Patented May 22, 1917.

Application filed February 4, 1916. Serial No. 76,125.

*To all whom it may concern:*

Be it known that I, HERBERT JOSEPH LEY, a citizen of the United States, residing at Lawrenceburg, county of Lawrence, State of Tennessee, have invented an Improvement in Barns, of which the following is a specification.

This invention relates to the construction of barns of any suitable material, preferably of reinforced concrete, and the invention consists in an arrangement of granaries, bins, chutes, stalls, drinking troughs, drains, &c., which will produce an attractive structure both interiorly and exteriorly, will utilize all the space, will be compact, sanitary and very convenient, and which shall be adapted for the installation of machinery for storing and feeding purposes, the machinery, however, not being illustrated herein as it forms no portion of the present invention.

Figure 1:
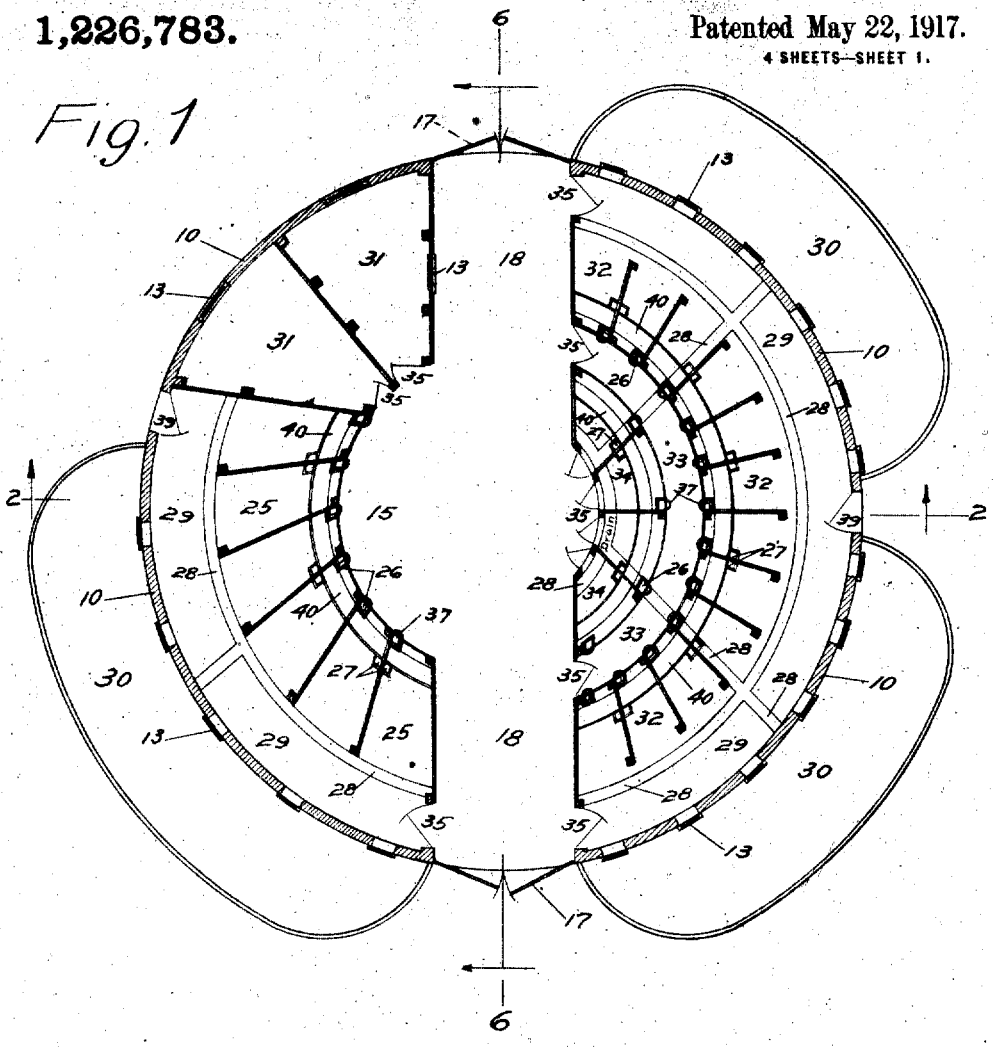
Figure 2:
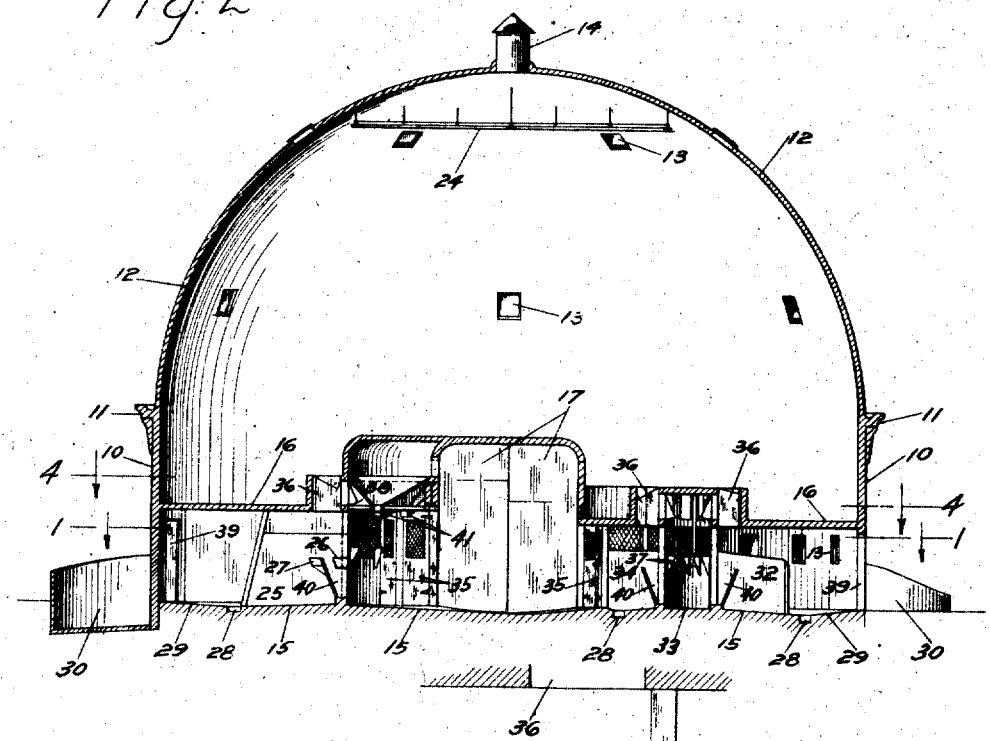
Figure 3:
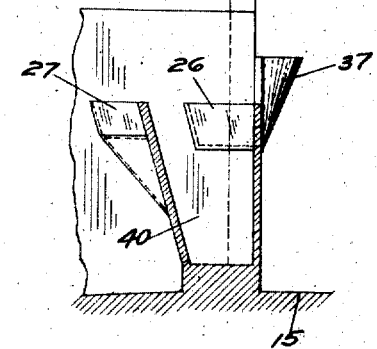
Figure 4:
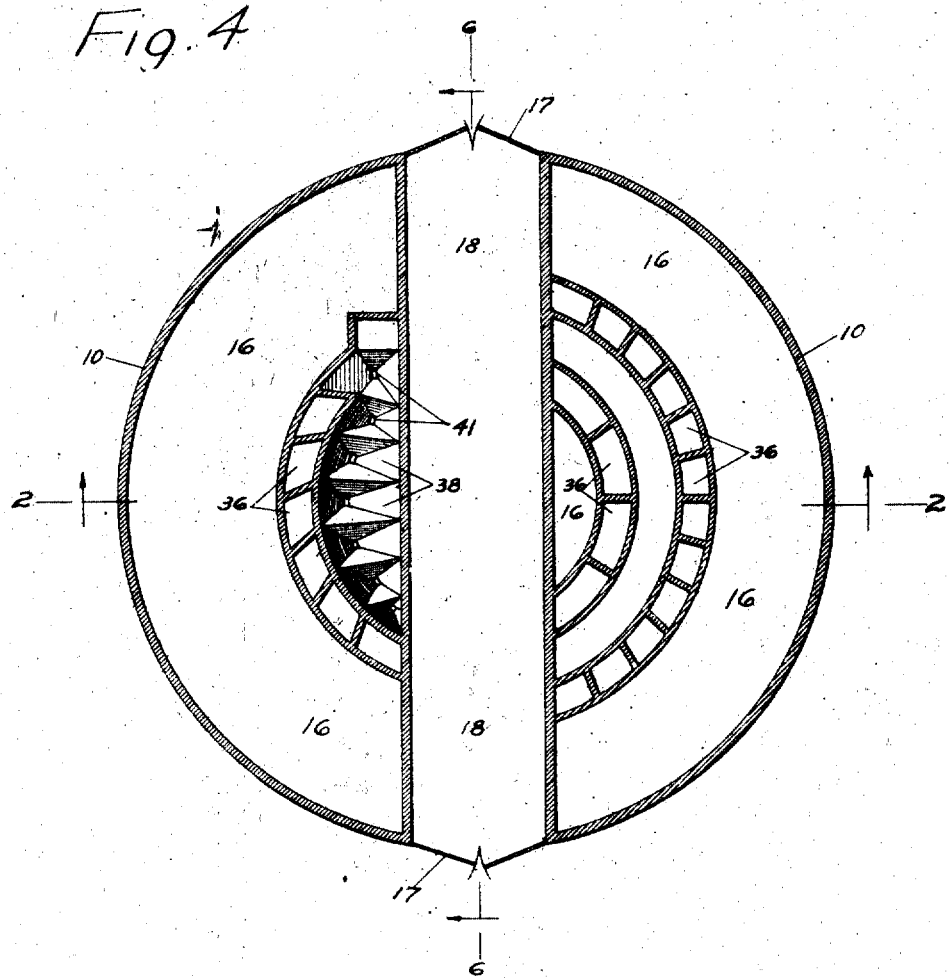
Figure 5:
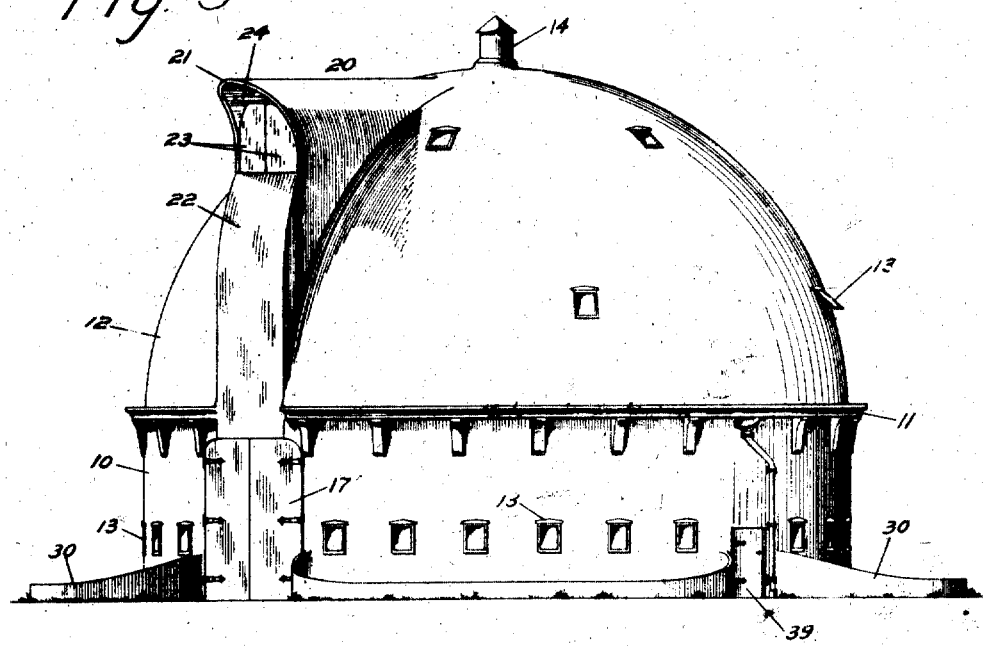

In the accompanying drawings forming a portion of this specification,

Figure 1 is a horizontal section on the line 1—1 in Fig. 2, looking down, showing the floor plan of my novel barn;

Fig. 2 a vertical section on the line 2—2 in Figs. 1 and 4, looking in the direction of the arrows;

Fig. 3 a detail view on an enlarged scale, of one of the stalls;

Fig. 4 a section on the line 4—4 in Fig. 2, looking down, showing the second story plan of bins, chutes, &c.;

Fig. 5 an elevation of my novel barn complete; and

Figure 6:
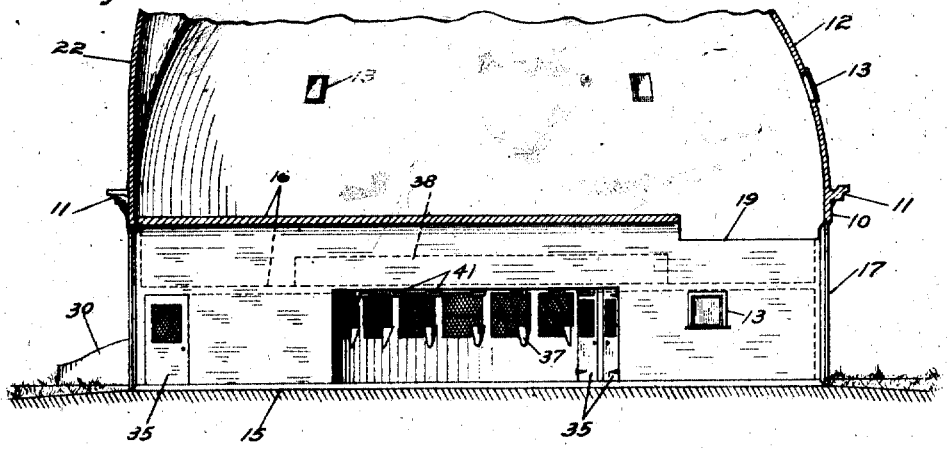

Fig. 6 is a vertical section on the line 6—6 in Figs. 1 and 4, looking in the direction of the arrows.

10 denotes the outer wall of my novel barn which is circular and is preferably, although not necessarily, of reinforced concrete. At a suitable height from the ground to produce the best artistic results is a cornice 11, and above the cornice a dome 12. Windows 13 are provided in the outer wall and the dome wherever required, and at the apex of the dome is a ventilator 14.

15 denotes the ground floor and 16 the second floor, both of which, especially the ground floor, are preferably of concrete. Relatively large doors 17 are provided at front and rear and a driveway 18 entirely through the barn. Floor 16 is raised over the driveway sufficiently to permit an ordinary load of hay to pass under said floor and at the rear end of the driveway I provide an opening 19 in said floor which permits hay, grain, &c., to be unloaded from within the barn. In order to provide for convenient unloading of hay, grain, &c., from outside the barn, I provide at the front a gable 20, the peak 21 of which overhangs the end wall 22, which is substantially vertical. Between the upper end of the end wall and the peak are doors 23. 24 denotes a track which is suspended from the dome and extends out to the peak of the gable. The track extends outward beyond the end wall far enough so that masses of hay or bags of grain may be drawn upward outside the end wall of the gable by hoisting mechanism on a suspended car. No car is shown and the track is not shown in detail. It is sufficient for the purposes of this specification to state that a circular track is suspended from the dome and provided with switches so that a car may be run out to the peak of the gable and straight across under the dome or around the dome in either direction. In practice I contemplate providing for the installation of machinery, such as hoists and cars for use in storing hay and grain and for feeding purposes, so that the operations of storing away hay and grain and of feeding stock shall be made as easy as possible and manual labor practically eliminated.

It will be noted from Figs. 1 and 4 that the principle of arrangement of stalls, granaries, cribs, &c., is circular to correspond with the outer wall. I do not wish to be understood as limiting myself to any special arrangement of these different parts. I have illustrated and will describe a model plan which, however, may be varied to any reasonable extent without departing from the principle of the invention. 25 denotes a series of relatively large stalls which may, for example, be used as horse stalls. Each stall is provided with a manger 40 for hay, a feed box 26 and with a trough 27 which is supplied with running water. This group of stalls is sector-shaped in plan. The stalls are wider in the rear than in front and the rear widths and front widths are practically uniform respectively. At the rear of this group of stalls is a drain 28 which has a branch leading across a walk 29 to a manure pit 30 outside the wall. Contiguous to stalls 25 and using up the remaining portion of one-half of the ground floor are two granaries or cribs 31, one of which may be used, for example, as a wheat granary, the other as a corn crib. Upon the other side of the barn and contiguous to a similar walk 29 is another sector-shaped group of stalls 32, the stalls being somewhat smaller than stalls 25. These may be used, for example, as cow stalls and are provided with mangers, feed boxes and water troughs, the same as stalls 25. Separated from stalls 32 by a walk 33 is still another sector-shaped group of stalls, indicated by 34. The stalls of this group do not open from the walk, however, but from the driveway. They are provided with mangers, feed boxes and water troughs like the others, and may be used, for example, as calf stalls. 35 indicates doors which may be placed at the ends of walks 29 and 33 and at the rear ends of stalls 34.

The mangers of stalls 25, 32 and 34, are supplied from above with hay through chutes 36 and the feed boxes are supplied with cut feed or grain through nozzles 37 which open outside the stalls. 38 (see Figs. 2 and 4) denotes a series of bins on the second floor. These bins have openings 41 through the floor which are closed in the usual manner by slides at the bottom. In practice, a track similar to track 24 will be provided under these bins and leading to the different feed boxes on the ground floor, so that a car may receive grain from any bin or bins and transport it to feed boxes into which it is delivered through the nozzles. 39 denotes small doors on opposite sides of the barn, which open into walks 29 and leave it ordinarily unnecessary to open the main doors.

Having thus described my invention, I claim:—

An improved barn comprising a circular outer wall, a driveway extending diametrically through the barn, curved walks contiguous to the wall, a plurality of sets of concentric semi-circular groups of stalls between said driveway and one of said walks, one group opening onto the walk and the other group opening into the drive-way, a walk between the groups, and a sector shaped group of stalls and a correspondingly shaped group of granaries arranged in a semi-circle on the opposite side of said drive-way and between the drive-way and the other walk.

In testimony whereof I affix my signature.

HERBERT JOSEPH LEY.